US009157408B2

(12) United States Patent
Dornhoefer

(10) Patent No.: US 9,157,408 B2
(45) Date of Patent: Oct. 13, 2015

(54) NOISE-OPTIMIZED STARTER DEVICE

(75) Inventor: Gerd Dornhoefer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 552 days.

(21) Appl. No.: 13/511,325

(22) PCT Filed: Nov. 17, 2010

(86) PCT No.: PCT/EP2010/067617
§ 371 (c)(1), (2), (4) Date: Aug. 8, 2012

(87) PCT Pub. No.: WO2011/061201
PCT Pub. Date: May 26, 2011

(65) Prior Publication Data
US 2012/0299417 A1 Nov. 29, 2012

(30) Foreign Application Priority Data
Nov. 23, 2009 (DE) ......................... 10 2009 046 988

(51) Int. Cl.
*F16H 57/04* (2010.01)
*F16N 15/00* (2006.01)
*F02N 15/04* (2006.01)
*F02N 15/06* (2006.01)

(52) U.S. Cl.
CPC ............... *F02N 15/06* (2013.01); *F02N 15/067* (2013.01); *F02N 2250/08* (2013.01)

(58) Field of Classification Search
CPC .............. F16H 57/041; F16H 57/0467; F16H 57/0475; F16H 57/048; F16H 57/0493
USPC ........ 74/6, 7 R, 7 E, 8, 457, 467–468, 421 R, 74/421 A
See application file for complete search history.

(56) References Cited

U.S. PATENT DOCUMENTS

| | | | | |
|---|---|---|---|---|
| 3,854,418 | A | 12/1974 | Bertin | |
| 5,203,224 | A | 4/1993 | Honda | |
| 5,912,520 | A * | 6/1999 | Kobayashi et al. | 310/80 |
| 6,782,773 | B1 | 8/2004 | Jacquemont et al. | |
| 2004/0237707 | A1 | 12/2004 | Jacquemont et al. | |
| 2009/0064806 | A1 * | 3/2009 | Hirabayashi | 74/6 |
| 2009/0176668 | A1 | 7/2009 | Shitara et al. | |
| 2011/0175476 | A1 | 7/2011 | Kugler | |

FOREIGN PATENT DOCUMENTS

| | | | | |
|---|---|---|---|---|
| CN | 1800623 | | 7/2006 | |
| CN | 101270316 | | 9/2008 | |
| CN | 101573528 | | 11/2009 | |
| DE | 19625892 | | 2/1997 | |
| DE | 10124506 | | 11/2002 | |
| DE | 102007026078 | A1 * | 12/2008 | F02N 15/06 |
| GB | 790 927 | * | 2/1958 | F16H 57/041 |
| JP | 04168947 | | 6/1992 | |
| WO | 2010136429 | | 12/2010 | |

OTHER PUBLICATIONS

PCT/EP2010/067617 International Search Report dated Feb. 15, 2011 (Translation and Original, 4 pages).

* cited by examiner

*Primary Examiner* — Burton Mullins
(74) *Attorney, Agent, or Firm* — Michael Best & Friedrich LLP

(57) ABSTRACT

The invention relates to a starter device (10) for cranking an internal combustion machine in a vehicle, having a pinion shaft (202) comprising a cranking pinion (22) at the front end and a pinion shaft (204) at the opposite end, slidingly guided and supported on a drive shaft (44) of the starter device (10) and received in a bearing by a bearing shell (210) of the starter device (10), characterized in that the cranking pinion (22) has a solid lubricant coating (216) at least in the area of the circumferential toothing (143).

11 Claims, 2 Drawing Sheets

NOISE-OPTIMIZED STARTER DEVICE

BACKGROUND OF THE INVENTION

The increasing use of start-stop systems in motor vehicles requires an expanded demand on the starting system and thereby also requires a functionality to enhance starter devices used to date. More stringent acoustic requirements are, e.g., to be mentioned in this regard as well as the need for the engine to be able to start again when a starting request of the driver is signaled ("change of mind function"). Especially when the internal combustion engine is coming to a stop, this restarting of the engine is not possible using the classic principle of starters used to date.

The German patent publication DE 101 24 506 A1 relates to a starter for a motor vehicle. The starter comprises a housing, an engaging relay disposed parallel thereto and containing a solenoid switch, and an engagement lever rotatably mounted in a transition area between the hollow housing and the engaging relay for coupling the starter motor to the internal combustion machine. A seal is provided to prevent contaminants and moisture from penetrating into the engaging relay. The seal is formed by a rubber membrane within the transition area between the housing and said engaging relay.

The German patent publication DE 10 2009 026 593.7 relates to a method for mechanically synchronizing two rotating, axially offset spur gears as well as to a machine, in particular an electrical starter device. Said starter device comprises a spur gear, particularly configured as a cranking pinion, which interacts with a driving plate disposed on an axial side of the spur gear. Said axial side faces away from a lifting means of the spur gear, the driving plate being restricted in rotation relative to the spur gear, whereby tooth gaps of the spur gear are closed.

Whereas starter devices in motor vehicles used to date perform approximately 40,000 startups and run through the operating cycles required in doing so, the requirement exists with current start-stop modes (SSM functionality) for the internal combustion machine to be able to be turned off in order to save fuel during extended waiting times, hence, e.g., at closed railway intersections, at lengthy red lights or in traffic jams. This is made increasingly possible in current motor vehicles due to the SSM functionality. This means a considerably increased actuating frequency for the starter devices used to date for starting the internal combustion engine, and therefore said starter devices must be designed such that up to a half million or more startups of the internal combustion engine are ensured. Firstly high demands are thus place on the service life and reliability of said starter devices; and secondly in light of such a high number startups, the demand increases for a minimization of the accompanying noise. It has been established that the starter device represents a considerable source of noise which is no longer tolerated by the passengers and automobile manufacturers of luxury passenger cars, in which said starter devices are used.

Normally the startup of an internal combustion machine is introduced in such a way that the internal combustion machine is turned over such that a compression of a suitable gas-air mixture is thereby generated; thus enabling said machine to run independently after the mixture has been ignited. To meet this end, electrically driven starter devices are normally used, the pinions of which are guided into the starter ring gear of the internal combustion machine and drive said ring gear. In so doing, it is possible that the pinion does not optimally engage in the ring gear. On the contrary, the pinion toothing does not engage in a gap between two teeth of the ring gear but said toothing strikes tooth on tooth and thus prevents engagement. Borderline cases can occur somewhere in between meshing and striking tooth on tooth, where, e.g., the tooth strikes only with half a side on the toothing of the ring gear. The noise emission is considerable when the toothings do not engage with each other properly.

The Japanese patent application JP 04 168 947 relates to a starter device. According to this solution, a component is provided with a solid lubricant to prevent adhesive wear and to dampen noise occurring during metal contact, said solid lubricant being applied to the pinion toothing.

SUMMARY OF THE INVENTION

Pursuant to the proposed solution according to the invention, a functional improvement with regard to the engagement of the cranking pinion with the ring gear of the internal combustion machine is achieved with as little as possible additional effort, i.e without constructive changes on existing systems needing to be performed. Due to reduced friction, the noise occurring during engagement is at least reduced if not completely suppressed by a dry lubrication being used to reduce the friction. In an advantageous embodiment variant to the thought underlying the invention, the pinion to be engaged into the ring gear of the internal combustion engine is provided with a solid lubricant coating within the toothing, which as a rule relates to an external helical toothing, as well as on the end face thereof. The solid lubricant coating is bonded to the surface of the engagement pinion by means of a suitable bonding system, as, e.g., polyamide-imide, epoxy and the like. Materials which can be used as solid lubricants are those which can withstand specifically high contact pressures as they occur within involute tooth flanks having rolling contact with one another, as, e.g., $MoS_2$ and graphite. If need be, an additive as, e.g., PTFE, which reduces the static friction, can be added to the aforementioned solid lubricants. The solid lubricants are preferably applied within the framework of an antifriction coating, which in fact is worn down in the course of the operating time, whereby however ideally smooth, well broken in surfaces emerge. By means of this solution, particularly an adhesive wear, which otherwise would ruin the surfaces, can be prevented.

The possibility alternatively exists for the ring gear of the internal combustion engine to also be provided with a solid lubricant.

BRIEF DESCRIPTION OF THE DRAWINGS

The invention is explained below in more detail with the aid of the drawings.

In the drawings.

DETAILED DESCRIPTION

Figure 1:
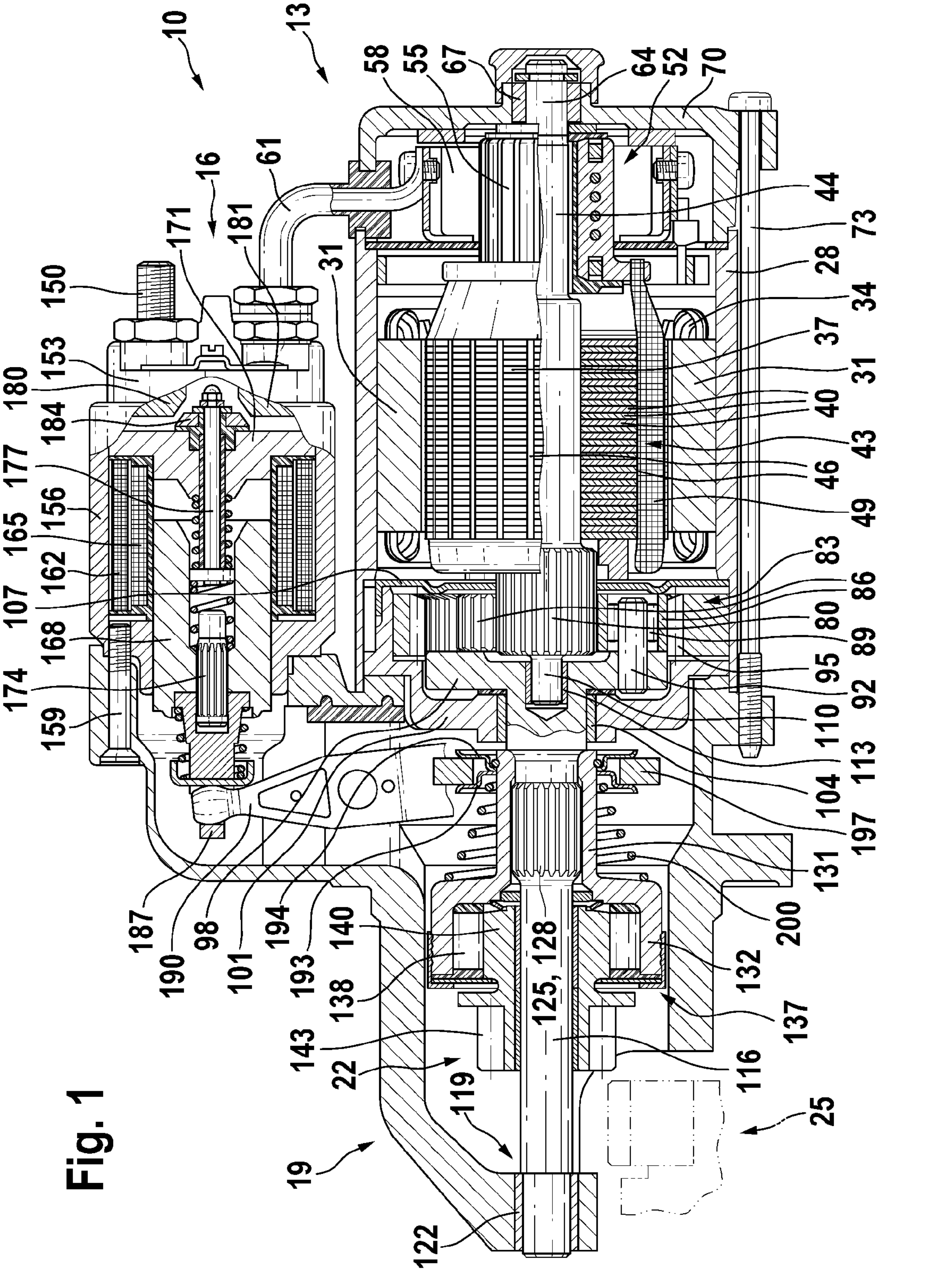
FIG. 1 shows a sectional view of an electric machine, in particular a starter device including solenoid switch, cranking pinion and engagement apparatus.

FIG. 1 shows a starter device in longitudinal sectional view. A starter device 10 is provided with a cranking pinion, which is still surrounded by a part of the housing of the starter device. The following embodiments also apply to a free-ejecting starter device, i.e for a starter device, in which the cranking pinion is completely exposed on its circumference after actuation of the engaging relay.

The starter device 10 depicted in FIG. 1 comprises, for example, a starter motor 13 and an engaging relay 16. The starter motor 13 and the engaging relay 16 are mounted on a common drive-end bracket 19. Said starter motor 13 is designed to drive a cranking pinion 22 when said pinion is engaged in the ring gear of the internal combustion machine which is not depicted here.

The starter motor 13 comprises a pole tube 28 as housing, which carries pole shoes 31 on the inner circumference thereof, said pole shoes being in each case wound with a field winding 34. The pole shoes 31 surround in turn an armature 37, which has a laminated armature core 43 composed of laminations 40 and an armature winding 49 arranged in grooves 46. The laminated armature core 43 is pressed on a drive shaft 44. A commutator 52, which among other things is composed of individual commutator laminations 55, is furthermore mounted on the end of the drive shaft 44 facing away from the cranking pinion 22. The commutator laminations 55 are electrically connected to the armature winding in a known manner such that when current is applied to said commutator laminations 55 via carbon brushes 58, a rotary motion of the armature 37 results in the pole tube 38. In closed-circuit condition, a power supply 61 disposed between the engaging relay 16 and the starter motor 13 provides the carbon brushes 58 as well as the field winding 34 with current. The drive shaft 44 is supported on the commutator side using a shaft extension 64 in a journal bearing 67, which is in turn fixedly held in a commutator bearing cover 70. The commutator bearing cover 70 is in turn mounted in the drive-end bracket 19 by means of tension rods 43 (screws, as, e.g., two, three or four in number), which are disposed distributed about the circumference of the pole tube 28. In this instance, the pole tube 28 is supported on the drive end bracket 19 and the commutator bearing cover 70 on the pole tube 28.

A sun wheel 80 adjoins the armature 37 as seen in the drive direction and is part of a planetary gear 83. The sun gear 80 is surrounded by several planet wheels 86, usually three planet wheels 86, which are supported on axle journals 92 using roller bearings 89. The planet wheels 86 ride on a ring gear 95, which is supported on the outside in the pole tube 28. A planet carrier 98, in which axle journals 92 are accommodated, adjoins the planet wheels 86 in the direction towards the drive side. The planet carrier 98, in turn, is supported in an intermediate bearing 101 and a journal bearing 104 situated in the latter. The intermediate bearing 101 is designed to be cup-shaped in such a way that both planet carrier and planet wheels 86 are accommodated therein. Furthermore, the ring gear 95 is disposed in the cup-shaped intermediate bearing 101, said ring gear being ultimately closed off by a cover 107 across from the armature 37. The intermediate bearing 101 is also supported by the outer circumference thereof on the inside of the pole tube 28. At the end of the drive shaft 44 facing away from the commutator 52, the armature 37 has an additional shaft extension 110 that is also accommodated in a journal bearing 113. The journal bearing 113 is accommodated in a central bore of the planet carrier 98. Said planet carrier 98 is connected as one piece to the driven shaft 116. Said driven shaft 116 is supported at the end thereof facing away from the intermediate bearing 101 in an additional bearing 122 of the drive side bearing (A-bearing). Said driven shaft 116 is subdivided into different sections: Thus the section that is situated in the journal bearing 104 of the intermediate bearing 101 is followed by a section having straight-tooth bevels 125 (internal toothing), which is part of a shaft-driving collar connection. This shaft-driving collar connection 128, in this case, enables the axially straight-line sliding of a driver 131. The driver 131 is a sleeve-like extension, which is made in one piece with a cup-shaped outer ring 132 of the free-wheel 137. The free-wheel 137, which, e.g., can be designed as a directional locking mechanism, further comprises an inner ring 140, which is disposed radially within the outer ring 132. Clamping bodies 138 are disposed between the inner ring 140 and the outer ring 132. The clamping bodies 138, in cooperation with the inner ring and the outer ring, prevent the relative rotation between the outer ring and the inner ring in a second direction. The free wheel 137 therefore enables a relative motion between the inner ring 140 and the outer ring 132 in only one direction. In this exemplary embodiment, the inner ring 140 is embodied as one piece with the cranking pinion 22 and the helical gear 143 thereof, which is designed as an outer helical gear.

For the sake of completeness, the engaging mechanism is examined below. The engaging relay 16 has a bolt 150 which is an electrical contact and which is connected to the positive pole of an electric starter battery, which is not shown here. The bolt 150 is guided through a relay cover 153. The relay cover 153 closes off a relay housing 156, which is fastened to the drive-end bracket 19 using several fastening elements 159, e.g. screws. A pull-in winding 162 and a hold-in winding 165 are furthermore disposed in the engaging relay 16. The pull-in winding 162 and the hold-in winding each act to form an electromagnetic field in the switched-on state, which flows through the relay housing 156 (made of electromagnetically conductive material), through a linearly movable armature 168 and an armature magnetic yoke 171. The armature 168 carries a push rod 174, which, when the armature is linearly drawn in, is moved in the direction of a switching bolt 177. With this motion of the push rod 174 to the switching bolt 177, the latter is moved from the rest position thereof in the direction towards two contacts 180, 181, so that a contact bridge 184 mounted at the end of the switching bolt 177 oriented towards the contacts 180 and 181 electrically connects the two contacts 180 and 181 to one another. In so doing, electric power is conveyed from the bolt 150, past the contact bridge 184, to the electric power supply 61 and thereby to the carbon brushes 58. The starter motor 13 is thereby supplied with current.

The engaging relay 16 or respectively the armature 168 in addition also has the task of moving a lever disposed in a rotationally movable manner at the drive-end bracket 19 using a pulling element 187. The lever 190, usually designed as a fork lever, encompasses two disks 193, 194 using two unspecified “prongs” at the outer circumference thereof in order to move a driving collar 197 clamped between said two disks towards the free-wheel 137 against the resistance of the spring 200, and thereby to engage the cranking pinion 22 with the ring gear 25 of the internal combustion engine, which is not shown in FIG. 1.

Figure 2:
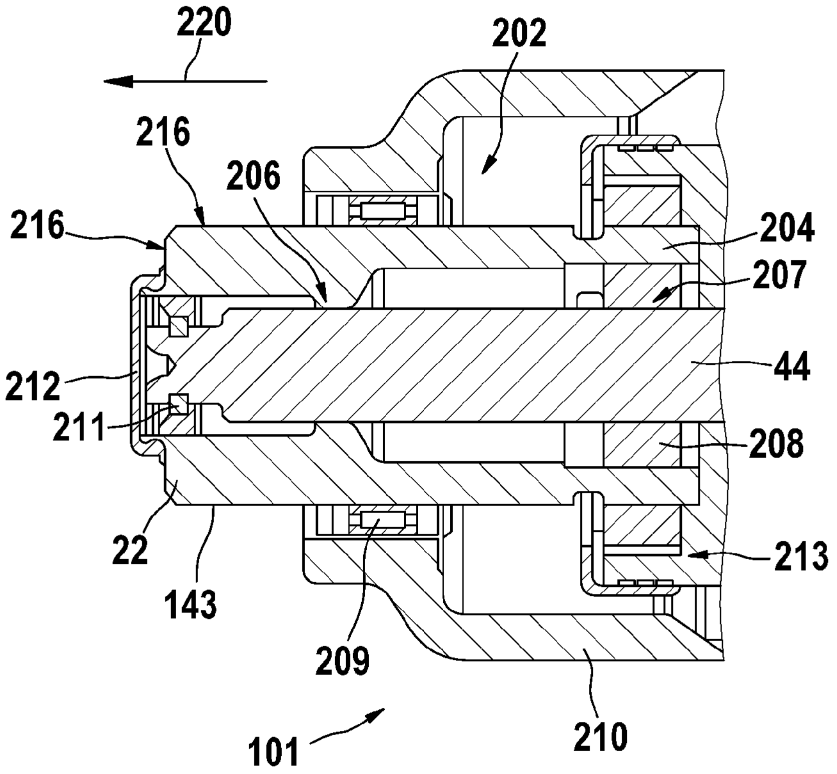
FIG. 2 shows a schematic cross sectional view of a pinion shaft mounted on a drive shaft in a first embodiment variant and FIG. 3 shows a schematic cross sectional view of a pinion shaft according to a second embodiment.

A section in an enlarged cross section of a starter device 10 for cranking an internal combustion engine in a motor vehicle can be seen in the depiction pursuant to FIG. 2.

The starter device 10 is of the type of a free-ejecting starter having a pinion shaft mounted on one side, on which a cranking pinion 22 is configured, which is engaged with a ring gear by means of a relay in order to start an internal combustion engine and is again disengaged from the ring gear after the internal combustion engine has run up.

The pinion shaft 202 is rotatably mounted on a drive shaft of the starter device 10 in order to allow for a relative rotational speed, which occurs when the internal combustion machine runs up and a higher rotational speed is achieved at the ring gear than the starter has specified via the drive shaft 44. This relative rotational speed has a very short operating time in the starting cycle, in particular in modern vehicles having a start button the operating time is definitely shortened, because a starting time controller takes the cranking pinion 22 out of engagement with the ring gear after the startup of the internal combustion machine.

The pinion shaft 202 comprises a first bearing section 206 and a second bearing section 207. The first bearing section is an outer section, which lies closest to the cranking pinion 22, whereas the second bearing section 207 is an inner section comprising a bearing bushing 208 which is manufactured from a soft material as, for example, a sintered bronze material. The bearing bushing 208 is surrounded by a lubricant or respectively saturated with a lubricant in order to improve the sliding properties and for protection against corrosion as well as for noise reduction. The bearing bushing 208 can also have a lubricant depot in the form of a circumferential groove, a so-called pocket. In order to bridge a large inside diameter of the pinion shaft 202, the bearing bushing 208 in this embodiment is designed preferably thick as viewed in cross section and having a large wall material thickness.

The pinion shaft 202 is directly supported on the first bearing section 206 without a sinter bushing or an intermediary roller bearing on the drive shaft 44. Hence, a hard-hard mounting is present because the hard material of the pinion shaft 202 is supported on the hard material of the drive shaft. Such a mounting is sufficient because the service life is in total very short with respect to conventional roller bearings of several thousand hours and mountings in a bushing. The total service life of the hard-hard mounting amounts to typically 10 to 12 hours when viewed over the service life of the starter device 10. This operating time accrues when a relative rotational speed occurs between the pinion shaft 202 and the drive shaft 44.

The pinion shaft 202 is received by a roller bearing 209, which is inserted into a bearing shell 210 of the starter device 10. In order to protect the hard-hard mounting from environmental influences such as dust, moisture and abrasion, a sealing cap 212 on the end face of the cranking pinion 22 totally closes off the mounting. The axial engaging movement of said cranking pinion 22 is limited by a pinion stop 211 on the drive shaft 44. The pinion stop 211 comprises a stop ring and a circlip. The pinion shaft 202 is operatively connected to the drive shaft 44 by means of a freewheeling clutch 213, and therefore said cranking pinion 211 can be driven with a torque from said drive shaft 44 and a relative rotational speed having a higher rotational speed of said cranking pinion can be implemented in the overrun case during run up of the internal combustion engine.

Bearing surfaces at the first bearing section 206 of the drive shaft 44 and/or the pinion shaft 202 are specially hardened in an advantageous manner. Said bearing surfaces have an antifriction coating. For manufacturing reasons, the diameter over the length of the bearing sections 206, 207, on which the cranking pinion 22 with a pinion shaft is supported, is substantially constant. The inside diameter of the pinion shaft 204 is configured with a considerably larger inside diameter in the area of the second bearing section 207 including the bearing bushing 208 up to the first bearing section 206 than the bore from the end face on the cranking pinion 22 up to said first bearing section 206. In so doing, a pinion shaft 202 results having a significant reduction in weight due to thinner wall thicknesses, which contributes to a conservation in the use of materials with respect to a pinion shaft according to prior art.

In an advantageous manner, a starter device 10 designed to be free-ejecting is therefore very easy to assemble. Merely a wide, thick bearing bushing 208 is inserted at an end face, which lies opposite to the cranking pinion 22, and subsequently the pinion shaft 204 including at least one bearing section is pushed directly on to the drive shaft 44 in a supporting manner.

Figure 3:
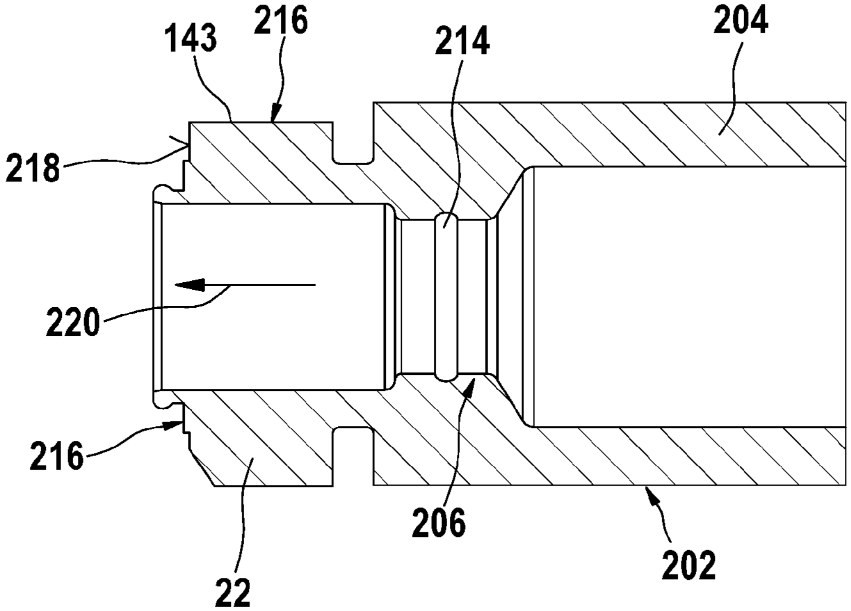

An enlarged section within the cross section of a pinion shaft 202 in a particularly preferred embodiment can be seen in the depiction pursuant to FIG. 3.

FIG. 3 shows the section comprising the cranking pinion 22 in the area around the first bearing section 206. According to a particularly preferred embodiment, the bearing section 206 of the pinion shaft 202 has a circumferential lubrication groove 214. The circumferentially configured lubrication groove 214 serves as a lubrication depot in order to provide the bearing section 206 with sufficient lubricant during the entire service life thereof. Said first bearing section 206 is configured in front of the cranking pinion 22 on the pinion shaft 204.

The cranking pinion 22 depicted in FIGS. 2 and 3 is characterized in that a solid lubricant coating 216 is configured in the helical toothing thereof, which is designed as external helical toothing, along the entire circumference. The bonding of the solid lubricant coating 216 to the surface, i.e. an end face 218 of the cranking pinion 22 or respectively to the tooth flanks of the external toothing 143 takes place via a suitable bonding system as, e.g., polyamide-imide and epoxy. The precondition for a good coating adhesion is a surface treatment suited to the solid lubricant coating 216 for the respective solid lubricant coating as, for example, phosphortizing and sand blasting and if need be a thermal method as, for example, burn-in, which serve to improve the coating properties.

The solid lubricant coating (216) comprises particularly a lubricant which withstands high specific contact pressures as, e.g., $MoS_2$ and graphite. Very high contact pressures extending in the form of a contact ellipse occur in involute toothings of the helical gearings 143. If need be, the material of the solid lubricant coating 216 can be enhanced by materials which particularly reduce static friction as, e.g., polytetrafluoroethylene (PTFE). An antifriction coating, in the framework of which the solid lubricant coating 216 can be applied, will indeed wear down during the course of use; however, a surface that has been very smoothly broken in emerges, and therefore particularly adhesive wear, which damages the surfaces, can be prevented.

In a further development of the idea underlying the invention, the ring gear 25 of the internal combustion engine, which is indicated in the longitudinal section pursuant to FIG. 1, could also be coated with a solid lubricant coating 216.

What is claimed is:

1. A starter device (10) for cranking an internal combustion machine in a vehicle, the device including a pinion shaft (202) comprising a cranking pinion (22) at a front end, wherein the pinion shaft (202) is slidingly guided and supported on a drive shaft (44) of the starter device (10) and received in a bearing by a bearing shell (210) of the starter device (10), characterized in that the cranking pinion (22) has a toothing (143) and an end face (218), and a solid lubricant coating (216) is bound to at least portions of both the toothing (143) and the end face (218), wherein the solid lubricant coating (216) is bound to the toothing (143) and the end face (218) via a bonding system between the solid lubricant coating (216) and the portions of the toothing (143) and end face (218).

2. The starter device (10) according to claim 1, characterized in that the toothing (143) is an external helical toothing (143) of the cranking pinion (22).

3. The starter device (10) according to claim 2, characterized in that flanks of the external helical toothing (143) of the cranking pinion (22) are provided with the solid lubricant coating (216).

4. The starter device (10) according to claim 1, characterized in that the end face (218) is an end face of the cranking pinion (22) opposite to a ring gear (25) of the internal combustion machine.

5. The starter device (10) according to claim 4, characterized in that the ring gear (25) of the internal combustion machine is provided with a solid lubricant coating (216).

6. The starter device (10) according to claim 4, characterized in that the ring gear (25) of the internal combustion machine and the entire cranking pinion (22) are provided with a solid lubricant coating (216).

7. The starter device (10) according to claim 1, characterized in that the solid lubricant coating (216) is manufactured from $MoS_2$ and withstands contact pressures extending in the form of a contact ellipse.

8. The starter device (10) according to claim 1, characterized in that the solid lubricant coating (216) contains additives which reduce static friction.

9. The starter device (10) according to claim 1, characterized in that the solid lubricant coating (216) is manufactured from graphite and withstands contact pressures extending in the form of a contact ellipse.

10. The starter device (10) according to claim 1, characterized in that the solid lubricant coating (216) is manufactured from $MoS_2$ and graphite and withstands contact pressures extending in the form of a contact ellipse.

11. The starter device (10) according to claim 1, characterized in that the solid lubricant coating (216) contains PTFE.

* * * * *